MAGNETIC PULSE MODULATOR

Filed Jan. 31, 1964

INVENTOR.
LAWRENCE H. O'BRIEN,
BY Paul M. Coble
ATTORNEY.

United States Patent Office 3,432,679
Patented Mar. 11, 1969

3,432,679
MAGNETIC PULSE MODULATOR

Lawrence H. O'Brien, Los Angeles, Calif., assignor to Hughes Aircraft Company, Culver City, Calif., a corporation of Delaware Filed Jan. 31, 1964, Ser. No. 341,631
U.S. Cl. 307—88 7 Claims
Int. Cl. H01f 27/42, 35/00; H03k 11/00

ABSTRACT OF THE DISCLOSURE

In the disclosed magnetic pulse modulator circuit a plurality of capacitors are directly connected to different points along the secondary winding of a saturable core transformer for forming in conjunction with the secondary winding a pulse forming delay line. A resonant charging network periodically drives the transformer saturable core to a first saturated condition, and a trigger pulse responsive electronic switch periodically causes the resonant charging network to transfer energy through the transformer to the delay line capacitors, while driving the saturable core through an unsaturated condition to a second saturated condition opposite to the first saturated condition.

Figure 1:
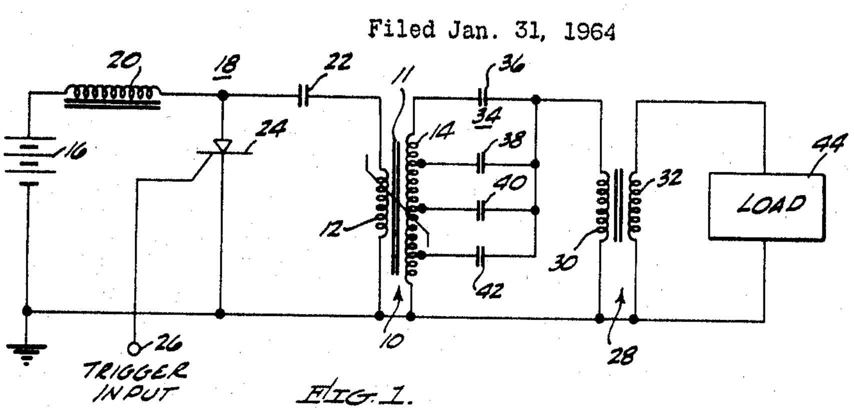

This invention relates to pulse modulator circuits, and more particularly relates to a magnetic pulse modulator including a uniquely combined saturable reactor and pulse-forming network.

Magnetic pulse modulators have undergone increased application in providing short-duration high-power pulses to a microwave generator at the transmitter end of a radar system. Such modulators usually comprise a charging network energized by a source of high voltage direct current and periodically connected to a saturable reactance transformer by means of an electronic switch. A separate and distinct pulse forming network in the form of an artificial delay line comprising a plurality of inductances and capacitances interconnects the secondary of the saturable reactance transformer with the microwave-generating load. Saturation of the saturable reactance transformer in response to the switched trigger signals initiates the propagation of energy along the pulse forming network to provide the high power pulses to the load.

In a magnetic modulator of the type described above, the inductance provided by the secondary of the saturable reactance transformer is connected in series with the pulse forming network. This inductance adds appreciably to the inductance of the pulse forming network, causing distortion of the output pulse and imposing a lower limit on the output pulse width. Thus, with prior art magnetic pulse modulators, it is impossible to achieve high power output pulses of a duration sufficiently short for many applications.

Accordingly, it is an object of the present invention to provide a magnetic pulse modulator which provides high power output pulses of shorter duration than has heretofore been possible.

It is a further object of the present invention to provide a pulse forming circuit including a saturable reactance transformer for providing high power output pulses of short duration and in which the output pulse shape is not distorted by the saturable reactance.

It is a still further object of the present invention to provide a magnetic pulse modulator including a plurality of saturable reactance transformer stages for furnishing high power short duration pulses to a microwave generating device, with greater voltage amplification being posisible in the final transformer stage, thereby requiring fewer stages to achieve a given amount of voltage amplification than in the prior art.

It is still another object of the present invention to provide a magnetic modulator including a unique circuit arrangement which singly performs the two functions of voltage step-up and pulse formation which previously were performed separately, enabling an elimination of circuit elements which reduces the size, weight and complexity of the overall modulator circuit.

In accordance with the foregoing objects, the magnetic modulator circuit of the present invention includes a transformer having a saturable core, a primary winding and a secondary winding. A plurality of capacitors are directly connected to different points along the secondary winding for forming in conjunction with the secondary winding a pulse forming delay line. Means such as a resonant charging network periodically drives the saturable core to a first saturated condition, and a trigger pulse responsive electronic switch periodically causes the resonant charging network to transfer energy through the transformer to the delay line capacitors, while driving the saturable core through an unsaturated condition to a second saturated condition opposite to the first saturated condition. An output circuit develops the output pulses during discharge of the delay line capacitors when the saturable core has been placed in its second saturated condition.

Figure 3:
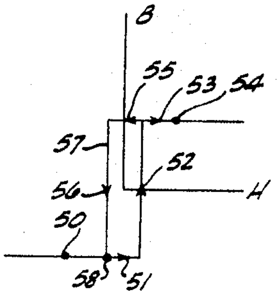
Figure 2:
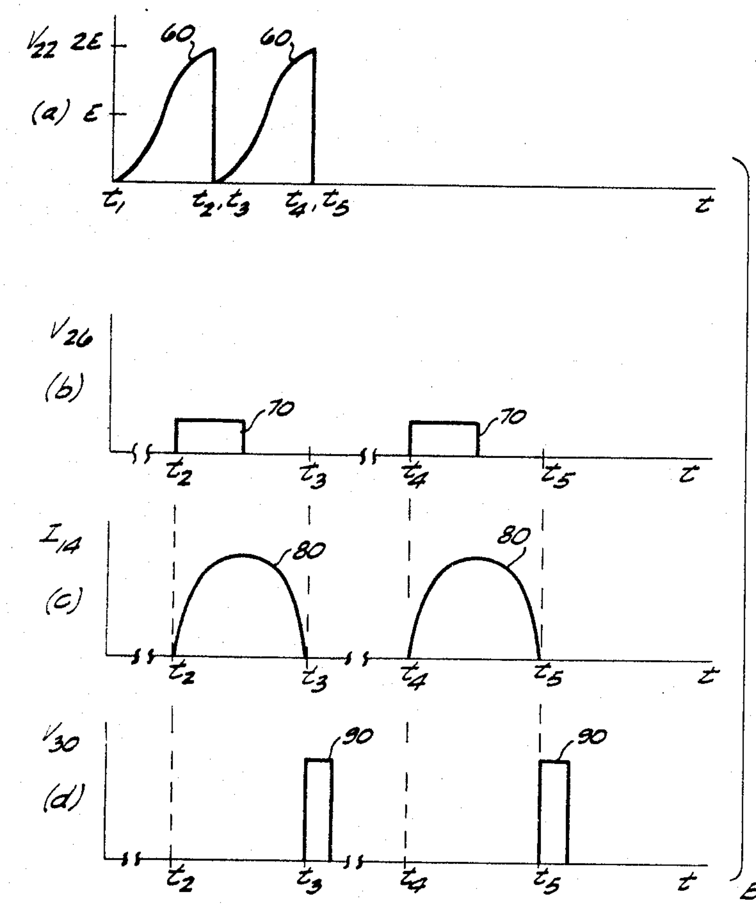

Additional objects, advantages and characteristic features of the present invention will become readily apparent from the following detailed description of a preferred embodiment of the invention when taken in conjunction with the accompanying drawings in which:

FIG. 1 is a schematic circuit diagram illustrating a magnetic pulse modulator circuit provided according to the principles of the present invention;

FIGS. 2(*a*)–(*d*) illustrate signal waveforms at various points in the circuit of FIG. 1 as a function of time; and FIG. 3 is a graph illustrating the B–H characteristics of the saturable reactance transformer of the circuit of FIG. 1.

Referring to FIG. 1 with more particularity, a magnetic pulse modulator circuit according to the present invention may be seen to comprise a saturable reactance transformer, or pulsactor, 10 having a saturable core 11, a primary winding 12, and a secondary winding 14. The secondary winding 14 preferably includes a greater number of turns than the primary winding 12 in order to provide voltage step-up. The primary winding 12 of the transformer 10 is coupled via a resonant charging network 18 to a source 16 of DC potential which, while illustrated as a battery, may be any DC power supply providing a relatively high voltage, for example in the range of from 28 to 200 volts. The resonant charging network 18 comprises an inductor 20 and a capacitor 22 connected in series, with the inductor 20 being connected to one terminal of the DC source 16 and the capacitor 22 being connected to one end of the primary winding 12. The resonant frequency of the charging network 18 is made essentially equal to half the pulse repetition frequency of the modulator. The other terminal of the source 16 and the other end of the primary winding 12 are both connected to a level of reference potential illustrated as ground in FIG. 1.

In order to allow the resonant charging network 18 to periodically energize the saturable reactance transformer 10, an electronic switching device 24 is coupled between the charging network 18 and ground. As is illustrated in FIG. 1, the electronic switching device 24 may be a silicon controlled rectifier having its anode connected to the junction between the inductor 20 and the capacitor 22 and its cathode connected to the ground level. The gate, or control, electrode of the rectifier 24 is connected to a terminal 26 which receives low power input pulses, of 3 to 6 volts at 50 to 100 ma. for example, for triggering the modulator. It is pointed out that the polarity of the DC source 16 may be reversed from that shown, in which case the polarity connection of the silicon controlled rectifier 24 would also be reversed. It is further pointed out that in order to provide the desired overall voltage amplification a plurality of cascaded pulsactor stages may be coupled between the charging network 18 and the pulsactor 10, with the pulsactor 10 then serving as the final pulsactor stage.

Output signals from the saturable reactance transformer 10 are applied through a pulse forming network, or artificial delay line, 34 to a pulse transformer 28 having a primary winding 30 and a secondary winding 32, one end of each winding being grounded. As contrasted with the prior art in which a separate and distinct pulse forming network is provided, the pulse forming network 34 of the present invention includes the secondary winding 14 of the saturable reactance transformer 10, as well as a plurality of capacitors 36, 38, 40 and 42. The capacitor 36 is connected between the ungrounded end of the primary winding 30 and the ungrounded end of the secondary winding 14, while the capacitors 38, 40 and 42 are connected between the ungrounded end of the primary winding 30 and different tapped points along the secondary winding 14. It should be appreciated that while four delay line capacitors are shown for illustrative purposes, the only requirement within the principles of the present invention is that two or more such capacitors be provided. Of course, the greater the number of capacitors, the more rectangular the output waveform. Connected across the secondary winding 32 of the pulse transformer 28 is a load 44 which may be a microwave generating device such as a magnetron, klystron or traveling-wave tube.

Operation of the circuit of FIG. 1 to provide high power pulses of short duration to the load 44 in response to the trigger pulses applied to the terminal 26 will now be described with reference to FIGS. 2 and 3. Assume, inititally, that the power supply 16 is connected into the circuit at a time $t_1$, and further assume that the core 11 of the transformer 10 is magnetized to a first saturated condition illustrated by the point 50 on the idealized hysteresis characteristic of FIG. 3 which shows the magnetic flux density B as a function of the magnetic field intensity H for the core 11. By saturated condition it is meant that after a relatively large change in magnetic flux density B for a relatively small change in magnetic field intensity H, for a further change in magnetic intensity H in the same direction, there is essentially no change in magnetic flux density B. At this time the silicon controlled rectifier 24 is in a blocking state, and the resonant charging network 18 commences to charge the capacitor 22 to a voltage 2E, where E is the magnitude of the voltage provided by the source 16. The curve 60 of FIG. 2(*a*) depicts the voltage $V_{22}$ across the capacitor 22 as a function of time. The time required for the capacitor 22 to charge to a voltage 2E, i.e. the time interval $t_1$–$t_2$, is equal to a half period for the resonant frequency of the network 18 as determined by the inductance 20 and the capacitance 22. As the capacitor 22 is being charged, the operating point on the B–H characteristic curve for the core 11 moves in the direction indicated by the arrows 51, 52 and 53 of FIG. 3 to set the core 11 to a second saturated condition of magnetization in the opposite direction from the first saturated condition, as illustrated by the point 54 on the B–H curve.

As is illustrated in FIG. 2(*b*), which shows the voltage $V_{26}$ at the input terminal 26 as a function of time, at time $t_2$ when the capacitor 22 has charged to a voltage 2E a trigger pulse 70 is applied to the terminal 26. It should be appreciated that the time scale for the graph of FIG. 2(*b*) is different from the time scale for the graph of FIG. 2(*a*), the time scales of FIGS. 2(*c*) and (*d*) being the same as that of FIG. 2(*b*), however. For example, whereas the time interval $t_1$–$t_2$ depicted in FIG. 2(*a*) may be of the order of 1 millisecond, the time interval $t_2$–$t_3$ in the graphs of FIGS. 2(*b*), (*c*) and (*d*) may be of the order of 1 microsecond.

Upon the application of the trigger pulse 70 to the terminal 26, the gate electrode of the silicon controlled rectifier 24 becomes positive with respect to the cathode, rendering the silicon controlled rectifier 24 heavily conductive. A low impedance is thus provided in the anode-cathode path of the rectifier 24 which effectively places the charged capacitor 22 directly across the primary winding 12 of the saturable reactor 10. The capacitor 22 then discharges through the primary winding 12 of the saturable reactance transformer 10, inducing a current in the secondary winding 14 of the transformer 10. The current $I_{14}$, which flows through the secondary winding 14 and charges the capacitors 36, 38, 40 and 42 of the pulse forming delay line 34, is illustrated by the curve 80 of FIG. 2(*c*). The discharge time constant for the capacitor 22 is determined by the capacitance 22 and the relatively low impedance presented by the silicon controlled rectifier 24 in its conductive condition and the primary winding 12 of the pulsactor 10. Hence, as may be seen from FIG. 2(*a*), the discharge time for the capacitor 22 is much smaller than its charging time. As energy is transferred through the transformer 10, the operating point on the B–H curve of FIG. 3 moves in the direction indicated by the arrows 55 and 56. The core 11 is thus driven out of saturation, and as the operating point traverses the curve portion 57, the transformer 10 functions as a normal unsaturated voltage step-up transformer.

At time $t_3$ the operating point on the B–H curve of FIG. 3 reaches the point 58 at which the core 11 becomes saturated in the original direction. The inductance presented by the secondary winding 14 then changes from its relatively high value which existed as long as the core was unsaturated to a value at least an order of magnitude smaller. The capacitors 36, 38, 40 and 42 in the pulse forming network 34 then discharges through the primary winding 30 of the pulse transformer 28, thereby transferring an output pulse 90, as shown in FIG. 2(*d*) which illustrates the voltage $V_{30}$ across the winding 30 as a function of time, through the transformer 28 to the load 44. On account of the voltage amplification in the pulsactor 10, the output pulse 90 may be of a large magnitude, for example 150 to 1000 volts for a single pulsactor stage.

When the core 11 is returned to its first saturated condition as depicted by the operating point 58 on the B–H characteristic curve of FIG. 3, a slightly negative voltage appears between the anode and cathode of the silicon controlled rectifier 24, thereby cutting off current flow through the rectifier 24 and returning the rectifier to its blocking state. Since the capacitor 22 has substantially discharged, the circuit is again in the initially assumed condition and is ready to repeat the aforementioned operating sequence.

Thus, during the time interval $t_3$–$t_4$ the capacitor 22 is charged to a voltage 2E, while the core 11 is switched from saturation at the point 58 to saturation in the opposite direction as depicted by the point 54. At time $t_4$ a trigger pulse 70 is applied to the terminal 26 to switch the silicon controlled rectifier 24 into conduction. During the time interval $t_4$–$t_5$ the pulsactor 10 functions as a normal voltage step-up transformer transferring energy from its primary winding to its secondary winding to charge the capacitors in the pulse forming network 34, while the operating point on the B–H curve for the core 11 moves from saturation at the point 54 through an unsaturation condition along the line 57 to saturation in the original direction at the point 58. At time $t_5$ when the pulsactor core 11 returns to saturation in the original direction, the capacitors 36, 38, 40, and 42 in the pulse forming network 34 discharge to provide a high power short duration output pulse 90 to the load 44.

During the discharge of the capacitors in the pulse forming network 34 the inductance of the secondary winding 14 of the pulsactor 10 is of a relatively low value, and since no additional inductance from a pulsactor secondary is placed in series with the pulse forming network inductance, the overall pulse forming network inductance is minimized. It should be remembered that in the prior art the inductance of the pulsactor secondary provides an additional inductance in series with the pulse forming network inductance. In the circuit of the present invention, however, this additional inductance has been eliminated because the pulsactor secondary inductance itself provides the pulse forming network inductance. By eliminating this unwanted inductance, the circuit of the present invention is able to provide high power output pulses of shorter duration and of a more ideal shape than had been possible in the prior art. For example, the output pulses 90 from the modulator of FIG. 1 have a duration of less than 0.5 microsecond.

Moreover, in view of the minimization of the overall pulse forming network inductance in the circuit of this invention, a greater number of turns may be tolerated in the secondary of the saturable reactance transformer 10, thereby achieving greater voltage amplification in the transformer 10 so that fewer transformer stages are required to achieve a given amount of voltage amplification than in the prior art. In addition, the integration of heretofore separate and distinct pulse forming network with the saturable reactance transformer, in accordance with the principles of the present invention, affords an elimination of circuit elements which reduces the size, weight, and complexity of the overall modulator circuit.

It is pointed out that although the present invention has been shown and described with reference to a particular embodiment, nevertheless, various changes and modifications obvious to one skilled in the art to which the invention pertains are deemed to lie within the purview of the invention.

What is claimed is:

1. A pulse forming network comprising in combination: a transformer having a saturable core and a primary winding and a secondary winding, a plurality of capacitors each having one electrode directly connected to a different point along said secondary winding, means coupled to said primary winding for driving said core to a first saturated condition, switching means coupled to said primary winding for activating said transformer to transfer energy from said driving means to said capacitors while driving said core through an unsaturated condition to a second saturated condition opposite to said first saturated condition, and output means coupled to the other electrodes of said capacitors for developing an output pulse from the energy stored in said capacitors when said core has been placed in said second saturated condition.

2. A pulse forming network comprising in combination: a transformer having a saturable core and a primary wind- directly connected between said conductor and one end ing and a secondary winding, a conductor, a first capacitor of said secondary winding, at least a second capacitor directly connected between said conductor and a tap on said secondary winding, means coupled to said primary winding for driving said core to a first saturated condition, switching means coupled to said primary winding for applying current thereto to induce current in said secondary winding which charges said capacitors while said core is driven through an unsaturated condition to a second saturated condition opposite to said first saturated condition, and output means coupled between said conductor and the other end of said secondary winding for developing an output pulse during the discharge of said capacitors.

3. A magnetic modulator circuit comprising in combination: a transformer having a saturable core and a primary winding for applying current thereto to energize means directly connected to tapped points along said secondary winding for forming in conjunction with said secondary winding a pulse forming delay line, means coupled to said primary winding for driving said core to a first saturated condition, and switching means coupled to said primary winding for applying current thereto to energize said delay line while said core is driven through an unsaturated condition to a second saturated condition opposite to said first saturated condition.

4. A pulse forming network comprising in combination: a transformer having a saturable core and a primary winding and a secondary winding, a reactance element and an electronic switch coupled in series across said primary winding, means for applying an energizing voltage to said reactance element, means for applying a trigger signal to said switch for controlling its conductive condition, a plurality of delay line capacitors each having one electrode directly connected to a different point along said secondary winding, and output means coupled to the other electrodes of said delay line capacitors for developing an output pulse.

5. A pulse forming network comprising in combination: a transformer having a saturable core and a primary winding and a secondary winding, a charging capacitor having one electrode coupled to one end of said primary winding, means for applying a charging voltage between the other electrode of said capacitor and the other end of said primary winding, an electronic switch coupled between said other electrode of said capacitor and said other end of said primary winding, means for applying a trigger signal to said electronic switch to close said switch and thereby cause said capacitor to discharge through said primary winding, a plurality of delay line capacitors each having one electrode directly connected to a different point along said secondary winding, and output means coupled to the other electrodes of said delay line capacitors for developing an output pulse.

6. A pulse forming network comprising in combination: a transformer having a saturable core and a primary winding and a secondary winding, a plurality of capacitors each having one electrode directly connected to a different point along said secondary winding, resonant charging means having one terminal coupled to one end of said primary winding for periodically driving said core to a first saturated condition, means for applying a direct voltage between the other terminal of said resonant charging means and the other end of said primary winding, an electronic switching device coupled between said resonant charging means and said other end of said primary winding, means for periodically applying trigger pulses to said electronic switching device with a pulse repetition frequency essentially equal to twice the resonant frequency of said resonant charging means to close said switching device and thereby cause said resonant charging means to transfer energy through said transformer while driving said core through an unsaturated condition to a second saturated condition opposite to said first saturated condition, and output means coupled to the other electrodes of said capacitors for developing an output pulse from the energy stored in said capacitors when said core has been placed in said second saturated condition.

7. A magnetic pulse modulator circuit for applying high power pulses of short duration to a load in response to trigger signals comprising in combination: power supply means for providing a direct voltage, a transformer having a saturable core and a primary winding and a secondary winding, said secondary winding having a greater number of turns than said primary winding and having a plurality of taps along its length, one end of said primary and secondary windings being coupled to one terminal of said power supply means, an inductor having one terminal coupled to another terminal of said power supply means, a charging capacitor coupled between the other terminal of said inductor and the other end of said primary winding, a controlled rectifier having an anode-cathode path and a control electrode, said anode-cathode path being coupled between the junction between said inductor and charging capacitor and said one terminal of said power supply means, means for applying input trigger pulses to said control electrode with a pulse repetition frequency essentially equal to twice the resonant frequency of said inductor and charging capacitor, a pulse transformer having a primary winding and a secondary winding, one end of said primary and secondary windings of said pulse transformer being coupled to said one terminal of said power supply means, said secondary winding of said pulse transformer being adapted for connection across a load, a first delay line capacitor directly connected between the other end of said primary winding of said pulse transformer and one end of said secondary winding of said saturable core transformer, and a plurality of delay line capacitors each directly connected between said other end of said primary winding of said pulse transformer and one of said taps along said secondary winding of said saturable core transformer.

References Cited

UNITED STATES PATENTS 2,990,481 6/1961 Standing et al. ........ 307—108

JAMES W. MOFFITT, *Primary Examiner.*

U.S. Cl. X.R.

307—106, 252, 314; 328—67; 332—12

UNITED STATES PATENT OFFICE
CERTIFICATE OF CORRECTION

Patent No. 3,432,679 March 11, 1969

Lawrence H. O'Brien

It is certified that error appears in the above identified patent and that said Letters Patent are hereby corrected as shown below:

Column 5, line 53, beginning with "2. A pulse forming" cancel all to and including "saturated condition." in line 6, column 6, and insert the following:

2. A pulse forming network comprising in combination: a transformer having a saturable core and a primary winding and a secondary winding, a conductor, a first capacitor directly connected between said conductor and one end of said secondary winding, at least a second capacitor directly connected between said conductor and a tap on said secondary winding, means coupled to said primary winding for driving said core to a first saturated condition, switching means coupled to said primary winding for applying current thereto to induce current in said secondary winding which charges said capacitors while said core is driven through an unsaturated condition to a second saturated condition opposite to said first saturated condition, and output means coupled between said conductor and the other end of said secondary winding for developing an output pulse during the discharge of said capacitors.

3. A magnetic modulator circuit comprising in combination: a transformer having a saturable core and a primary winding and a secondary winding, capacitive means directly connected to tapped points along said secondary winding for forming in conjunction with said secondary winding a pulse forming delay line, means coupled to said primary winding for driving said core to a first saturated condition, and switching means coupled to said primary winding for applying current thereto to energize said delay line while said core is driven through an unsaturated condition to a second saturated condition opposite to said first saturated condition.

Signed and sealed this 21st day of April 1970.

(SEAL)
Attest:

EDWARD M. FLETCHER, JR.
Attesting Officer

WILLIAM E. SCHUYLER, JR.
Commissioner of Patents